US012614372B2

(12) United States Patent
Kim et al.

(10) Patent No.: US 12,614,372 B2
(45) Date of Patent: Apr. 28, 2026

(54) METHOD AND DEVICE WITH OBJECT CLASSIFICATION

(71) Applicant: SAMSUNG ELECTRONICS CO., LTD., Suwon-si (KR)

(72) Inventors: Kikyung Kim, Suwon-si (KR); Jiwon Baek, Suwon-si (KR); Chanho Ahn, Suwon-si (KR); Seungju Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 18/193,712

(22) Filed: Mar. 31, 2023

(65) Prior Publication Data

US 2024/0161458 A1 May 16, 2024

(30) Foreign Application Priority Data

Nov. 10, 2022 (KR) ......................... 10-2022-0149282

(51) Int. Cl.
*G06V 10/764* (2022.01)
*G06V 10/70* (2022.01)

(52) U.S. Cl.
CPC ............ *G06V 10/764* (2022.01); *G06V 10/87* (2022.01)

(58) Field of Classification Search
None
See application file for complete search history.

(56) References Cited

U.S. PATENT DOCUMENTS

| | | | | |
|---|---|---|---|---|
| 7,460,715 | B2 * | 12/2008 | Lancieri .................. | G06F 16/48 |
| | | | | 382/209 |
| 11,170,272 | B2 * | 11/2021 | Hashimoto .......... | G06V 10/774 |
| 11,244,188 | B2 * | 2/2022 | Cholakkal .............. | G06V 10/82 |
| 11,263,744 | B2 * | 3/2022 | Yoo ........................ | G06T 7/0012 |
| 11,301,704 | B2 * | 4/2022 | Yoo ......................... | G06V 10/87 |
| 11,544,503 | B2 * | 1/2023 | Tensmeyer ....... | G06V 30/19147 |

(Continued)

FOREIGN PATENT DOCUMENTS

| | | |
|---|---|---|
| CN | 114155407 A | 3/2022 |
| CN | 114429565 A | 5/2022 |

(Continued)

OTHER PUBLICATIONS

Extended European search report issued on Feb. 20, 2024, in counterpart European Patent Application No. 23203408.2 (11 pages).

(Continued)

*Primary Examiner* — Anand P Bhatnagar
(74) *Attorney, Agent, or Firm* — NSIP Law

(57) ABSTRACT

Disclosed is a method that includes generating a prediction consistency value that indicates a consistency of prediction of an object in an input image with respect to class prediction values for the object in an input image from classification models to which the input image is input, and identifying a class of the object. Identifying the class of the object includes, in response to a class type being determined, based on the prediction consistency value, of the object being determined to correspond to a majority class, identifying a class of the object based on a corresponding class prediction value output for the object from a majority class prediction model, and in response to the class type of the object being determined to correspond to a minority class, identifying the class of the object based on another corresponding class prediction value output for the object from a minority class prediction model.

20 Claims, 11 Drawing Sheets

(56) References Cited

U.S. PATENT DOCUMENTS

| | | | | |
|---|---|---|---|---|
| 2005/0213810 A1* | 9/2005 | Sabe | ..................... | G06V 40/165 |
| | | | | 382/159 |
| 2018/0137119 A1* | 5/2018 | Li | ........................... | H04N 23/63 |
| 2019/0130188 A1* | 5/2019 | Zhou | ........................ | G06T 7/248 |
| 2020/0151481 A1* | 5/2020 | Yoo | ......................... | G06N 3/047 |
| 2022/0198657 A1 | 6/2022 | Hall et al. | | |
| 2023/0148321 A1* | 5/2023 | Hall | ........................ | G16H 40/67 |
| | | | | 706/12 |
| 2024/0412112 A1* | 12/2024 | Ishii | ........................ | G06N 20/00 |

FOREIGN PATENT DOCUMENTS

| | | | |
|---|---|---|---|
| CN | 114511739 A | 5/2022 | |
| EP | 3 996 103 A1 | 5/2022 | |
| KR | 10-2019-0048119 A | 5/2019 | |
| KR | 10-2022-0101255 A | 7/2022 | |
| WO | WO 2020/208445 A1 | 10/2020 | |
| WO | WO-2021195689 A1 * | 10/2021 | ............ G16H 50/70 |
| WO | WO 2021/195689 A8 | 11/2022 | |

OTHER PUBLICATIONS

Pleiss, Geoff, et al. "Identifying mislabeled data using the area under the margin ranking." *Advances in Neural Information Processing Systems* 33 (2020): pp. 17044-17056.

Kim, Jaehyung, Jongheon Jeong, and Jinwoo Shin. "M2m: Imbalanced classification via major-to-minor translation." *Proceedings of the IEEE/CVF conference on computer vision and pattern recognition*. 2020. pp. 13896-13905.

* cited by examiner

Start

210
Receive input image

220
Obtain class prediction values for object from classification models

230
Determine prediction consistency value based on class prediction values

240
Determine class type corresponding to object based on prediction consistency value 250
Determine class of object using class prediction model corresponding to class type End

METHOD AND DEVICE WITH OBJECT CLASSIFICATION

CROSS-REFERENCE TO RELATED APPLICATIONS

This application claims the benefit under 35 USC § 119(a) of Korean Patent Application No. 10-2022-0149282 filed on Nov. 10, 2022, in the Korean Intellectual Property Office, the entire disclosure of which is incorporated herein by reference for all purposes.

BACKGROUND

1. Field

The following description relates to a method and device with object classification.

2. Description of Related Art

Artificial intelligence (AI) technology includes machine learning training to generate trained machine learning models and machine learning inference through use of the trained machine learning models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented method is provided. The method includes generating a prediction consistency value that indicates a consistency of prediction of an object in an input image with respect to class prediction values for the object in an input image from classification models to which the input image is input, and identifying a class of the object. Identifying the class of the object includes, in response to a class type being determined, based on the prediction consistency value, of the object being determined to correspond to a majority class, identifying a class of the object based on a corresponding class prediction value output for the object from a majority class prediction model, and in response to the class type of the object being determined to correspond to a minority class, identifying the class of the object based on another corresponding class prediction value output for the object from a minority class prediction model.

Generating the prediction consistency value may include determining a mode class prediction value with a highest frequency among the class prediction values generated by the classification models, and generating the prediction consistency value based on a matching frequency between the class prediction values and the mode class prediction value.

Generating the prediction consistency value may include generating the prediction consistency value by dividing the matching frequency between the class prediction values and the mode class prediction value by a total number of the class prediction values.

The method may further include identifying the class type corresponding to the object to be one of the majority class and the minority class based on the prediction consistency value and a threshold value.

The method may further include, in response to a determination that the prediction consistency value is greater than the threshold value, identifying the class type corresponding to the object to be the majority class, and in response to a determination that the prediction consistency value is not greater than the threshold value, identifying the class type corresponding to the object to be the minority class.

The method may further include, in response to a determination that the object corresponds to the majority class, identifying the class of the object using an ensemble model of the classification models as the majority class prediction model.

The method may further include, in response to a determination that the object corresponds to the majority class, identifying the class of the object using a target classification model selected from among the classification models as the majority class prediction model.

The method may further include selecting, as the target classification model, a classification model having a best classification performance for the majority class during training of the classification models.

The method may further include, in response to a determination that the object corresponds to the minority class, the identifying of the class of the object may include determining the class of the object using a target classification model selected from among the classification models as the minority class prediction model.

The method may further include selecting, as the target classification model, a classification model having a best classification performance for the minority class during training of the classification models.

The classification models may include classification models trained with a same training dataset for a different numbers of times.

In one general aspect, a processor implemented method is provided. The method includes generating a prediction consistency value that indicates a consistency of prediction of an object in an input image with respect to class prediction values for the object in an input image from classification models to which the input image is input, identifying a class type corresponding to the object based on the prediction consistency value, and identifying a class of the object using a class prediction model corresponding to the identified class type.

The method may further include, in response to a determination that the class type of the object corresponds to a first class type, identifying the class of the object based on a class prediction value output for the object from a first class prediction model, and, in response to a determination that the class type of the object corresponds to a second class type different from the first class type, identifying the class of the object based on a class prediction value output for the object from a second class prediction model different from the first class prediction model.

Generating of the prediction consistency value may include determining a mode class prediction value with a highest frequency among the class prediction values generated from the classification models, and generating the prediction consistency value based on a matching frequency between the class prediction values and the mode class prediction value.

The method may further include, in response to a determination that the prediction consistency value is greater than a threshold value, determining the class type corresponding to the object to be a majority class, and, in response to a determination that the prediction consistency value is not greater than the threshold value, determining the class type corresponding to the object to be a minority class.

In one general aspect, a computing device is provided. The computing device includes one or more processors configured to execute instructions, and a memory storing instructions. Execution of the instructions by the one or more processors configure the one or more processors to generate a prediction consistency value that indicates a consistency of prediction of an object in an input image with respect to class prediction values for the object in an input image from classification models to which the input image is input, and identify a class of the object. When identifying the class of the object, the one or more processors are configured to, in response to a class type being determined, based on the prediction consistency value, of the object being determined to correspond to a majority class, identify a class of the object based on a corresponding class prediction value output for the object from a majority class prediction model, and in response to the class type of the object being determined to correspond to a minority class, identify the class of the object based on another corresponding class prediction value output for the object from a minority class prediction model.

The processors may be configured to determine a mode class prediction value with a highest frequency among the class prediction values generated by the classification models and generate the prediction consistency value based on a matching frequency between the class prediction values and the mode class prediction value.

The processors may be configured to, in response to a determination that the prediction consistency value is greater than a threshold value, determine the class type corresponding to the object to be the majority class, and in response to a determination that the prediction consistency value is not greater than the threshold value, identify the class type corresponding to the object to be the minority class.

The processors may be configured to, in response to a determination that the object corresponds to the majority class, determine the class of the object using an ensemble model of the classification models as the majority class prediction model.

The processors may be configured to, in response to a determination that the object corresponds to the minority class, determine the class of the object using a target classification model selected from among the classification models as the minority class prediction model.

Other features and aspects will be apparent from the following detailed description, the drawings, and the claims.

Figure 1:
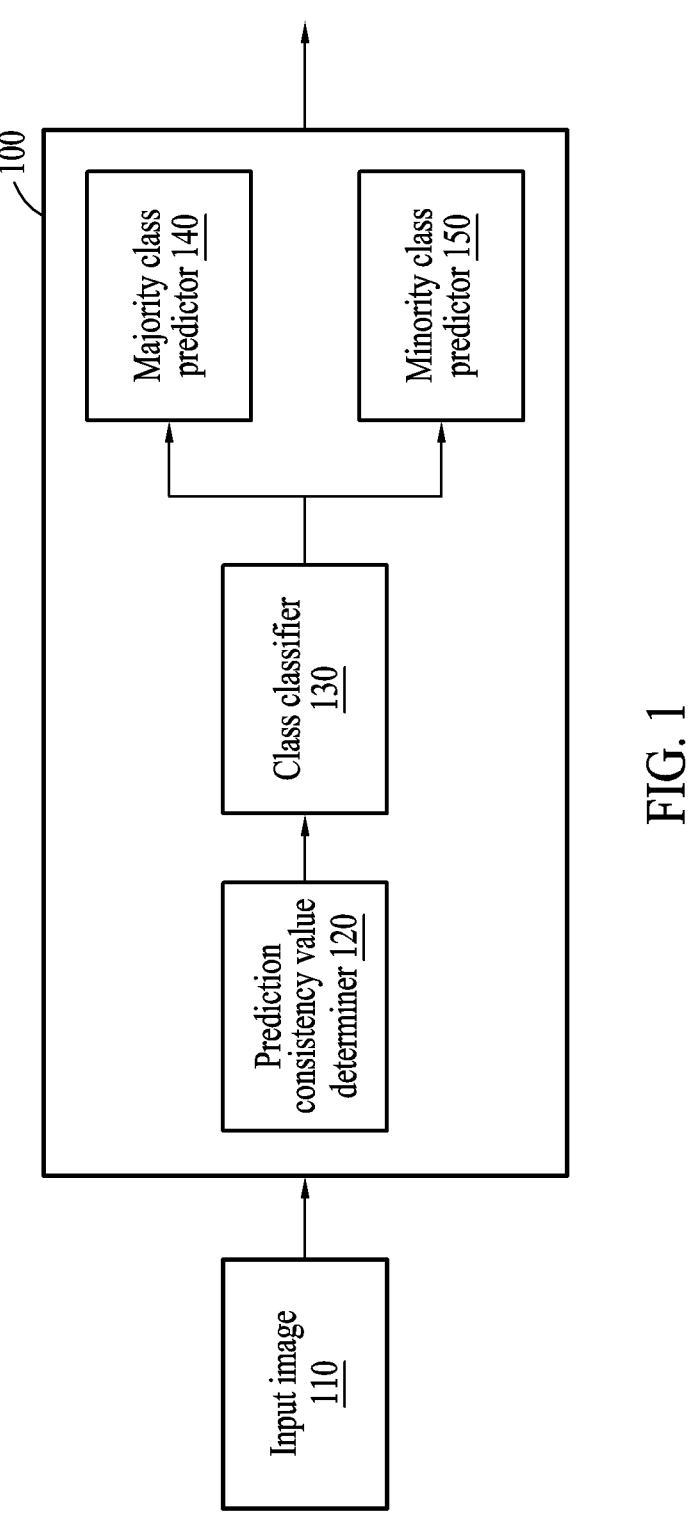
FIG. 1 illustrates an example of a computing device with object classification, in accordance with one or more example embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used in connection with various example embodiments of the disclosure, any use of the terms "module" or "unit" means hardware and/or processing hardware configured to implement software and/or firmware to configure such processing hardware to perform corresponding operations, and may interchangeably be used with other terms, for example, "logic," "logic block," "part," or "circuitry". As one non-limiting example, an application-predetermined integrated circuit (ASIC) may be referred to as an application-predetermined integrated module. As another non-limiting example, a field-programmable gate array (FPGA) or an application-specific integrated circuit (ASIC) may be respectively referred to as a field-programmable gate unit or an application-specific integrated unit. In a non-limiting example, such software may include components such as software components, object-oriented software components, class components, and may include processor task components, processes, functions, attributes, procedures, subroutines, segments of the software. Software may further include program code, drivers, firmware, microcode, circuits, data, database, data structures, tables, arrays, and variables. In another non-limiting example, such software may be executed by one or more central processing units (CPUs) of an electronic device or secure multimedia card.

Unless otherwise defined, all terms, including technical and scientific terms, used herein have the same meaning as commonly understood by one of ordinary skill in the art to which this disclosure pertains specifically in the context on an understanding of the disclosure of the present application.

Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

In an example, an AI system that implements human-level intelligence may enable a machine to learn and make decisions for itself and to become smarter, unlike a typical rule-based smart system. As used more, the AI system may have an increasing recognition rate and may more accurately understand the preference of a user.

One or more examples include technical fields such as linguistic understanding, visual understanding, inference/prediction, knowledge representation, motion control, and the like as non-limiting examples, with object classification.

One or more examples described herein may be various types of computing devices and processes may include devices and systems that perform semiconductor equipment/measurement processes, as non-limiting examples.

FIG. 1 illustrates an example of a computing device with object classification according to one or more example embodiments.

Referring to FIG. 1, a computing device 100 may classify an object included in an input image 110 that is captured by, or input to, the computing device 100. The computing device 100 may classify the object by determining a class corresponding to the object included in the input image 110. The class may represent a type or category of the object in the input image 110 into which the object is to be classified, and there may be various classes according to categories. For example, a type of each of numbers such as 0, 1, 2, 3, 4, and 5 may be a class, and a type of each of states such as normal, bad 1, and bad 2 may be a class. For another example, a type of each of different animals, such as a dog and a cat, may be a class, and a type of each of different objects, such as a person, a mobile phone, and a car, may be a class. The term "input image" described herein may be replaced with "input data." In examples, i.e., such captured or input data is not limited to image data.

In such image object classification, however, there may be an issue of class imbalance. Typically, most training datasets for image object classification may be configured to include an amount of training data that is sufficient for a classification model that classifies objects in an image to learn each class. However, collecting and/or generating an amount of training data to be sufficient for each of all classes may not be practically implementable or cost effective. Thus, there may be a difference in the respective amounts of training data between the classes, which may result in class imbalance. The class imbalance may refer to an issue that may occur when there is a great deviation in the amount of training data between classes, and this deviation affects the training and inference of the classification model, with the classification performance of the classification model being a degraded model compared to a model trained with balanced and sufficient amounts of training data. The class imbalance may particularly result in a degraded classification performance of the classification model for a class for which there is an insufficient amount of training data.

One or more examples herein may solve such a class imbalance issue described above by using a prediction consistency value, for example. In an example, the computing device 100 may classify a class type of the object in the input image 110 as one of a majority class and a minority class based on the prediction consistency value, and may use a class predictor corresponding to the class of the object based on a result of the classification. The computing device 100 may select a class predictor that is more suitable for the classified class of the object in the input image 110 from among class predictors based on the prediction consistency value and perform class classification using the selected class predictor, thereby improving the accuracy of the class classification.

In an example, the computing device 100 may include a prediction consistency value determiner 120, a class classifier 130, a majority class predictor 140, and a minority class predictor 150. Each of the prediction consistency value determiner 120, the class classifier 130, the majority class predictor 140, and the minority class predictor 150 are representative of one or more processors and memories storing instructions that configure the respective one or more operations of the prediction consistency value determiner 120, a class classifier 130, a majority class predictor 140, and a minority class predictor 150 described herein. Respective operations of two or any combination of two or more of the prediction consistency value determiner 120, the class classifier 130, the majority class predictor 140, and the minority class predictor 150 may be performed by respective one or more processors or respective processors and such memories.

The input image 110 input to the computing device 100 may be transmitted to the prediction consistency value determiner 120. In an example embodiment, before the input image 110 is transmitted to the prediction consistency value determiner 120, the computing device 100 may perform e.g., using any of the above-mentioned processors, or processors and memories, or another processor as processor and memory, image preprocessing on the input image 110 and transmit the input image 110 that has been preprocessed to the prediction consistency value determiner 120. The image preprocessing may include, for example, image rotation, enlargement, reduction, projection, binarization, color adjustment, contrast adjustment, histogram equalization, cropping, region of interest (ROI) extraction, and background region removal.

The prediction consistency value determiner 120 may obtain class prediction values for the object in the input image 110 using a plurality of classification models. Each of the classification models may be a model that uses the input image 110 as an input and outputs a class prediction value for the object included in the input image 110. In an example embodiment, the classification models may be models trained with the same dataset by different numbers of times of training or different numbers of epochs, as non-limiting examples. The classification models may be, for example, any or any combination of various machine learning modes, e.g., neural networks (e.g., convolutional neural networks (CNNs)). A neural network includes a model that implements nodes (or artificial neurons) with synaptic connections. For example, a neural network may be trained using training data by iteratively changing respective weightings (strengths) of the synaptic connections, such as through backpropagation and gradient descent. A node of the neural network may include a combination of weights and/or biases, and the neural network may include one or more layers each including a plurality of nodes. Briefly, any such reference herein to "neurons" is not intended to impart any relatedness with respect to how the neural network architecture computationally maps or thereby intuitively recognizes or considers information, and how a human's neurons operate. In other words, the term "neuron" is merely a term of art referring to the hardware connections implemented operations of nodes of a neural network, and will have a same meaning as the node of the neural network.

The prediction consistency value determiner 120 may determine a prediction consistency value based on the class prediction values output from the classification models. The prediction consistency value may indicate how consistently the classification models predict the class of the object included in the input image 110. In a distribution of the class prediction values output from the classification models, the prediction consistency value may increase as the number of the same class prediction values increases and may decrease as the number of the same class prediction values decreases. Therefore, a great prediction consistency value may indicate that classification models consistently predict the class of the object, and a small prediction consistency value may indicate that the classification models do not consistently predict the class of the object and their prediction results have thus a (for example, relatively) great deviation.

The class classifier 130 may determine a class type corresponding to the object based on the prediction consistency value. In an example embodiment, the class classifier 130 may compare the prediction consistency value and a threshold value and classify the class type of the object as a majority class or a minority class based on a result of the comparison. When the prediction consistency value is greater than the threshold value, the class classifier 130 may classify the class type of the object as the majority class. When the prediction consistency value is not greater than the threshold value (or less than or equal to the threshold value), the class classifier 130 may classify the class type of the object as the minority class.

The majority class may refer to a class that is learned by the classification models to have a relatively high classification accuracy because there is a sufficient amount of training data in a training process of the classification models. The minority class may refer to a class that is learned by the classification models to have a relatively low classification accuracy because there is a relatively insufficient amount of training data in the training process. When the class of the object is the majority class, the classification models in general may correctly predict the class of the object, and the prediction consistency value may therefore be great. When the class of the object is the minority class, the classification models may not correctly predict the class of the object, and the prediction consistency value may therefore be small. The majority class may be classified with a relatively high classification accuracy (e.g., a small deviation of the class prediction values of the classification models) from an early stage of the training (e.g., when the number of epochs is low), and the minority class may be classified with a relatively low classification accuracy (e.g., a great deviation of the class prediction values of the classification models) even when the training progresses. The computing device 100 may determine the prediction consistency value based on a difference between the majority class and the minority class as described above, and may infer the class of the object based on the prediction consistency value.

When the class type of the object is classified as the majority class by the class classifier 130, the class of the object may be determined by the majority class predictor 140. The majority class predictor 140 may determine the class of the object based on a class prediction value output for the object from a majority class prediction model which is a model for predicting a class of the majority class. As an example of the majority class prediction model, an ensemble model of the classification models providing the class prediction values may be used, but examples of which are not limited thereto. The majority class prediction model may be modified in various ways, which will be described in detail below with reference to FIG. 5.

When the class type of the object is classified as the minority class by the class classifier 130, the class of the object may be determined by the minority class predictor 150. The minority class predictor 150 may determine the class of the object based on a class prediction value output for the object from a minority class prediction model which is a model for predicting a class of the minority class. As an example of the minority class prediction model, a classification model having the highest classification accuracy for the minority class among the classification models providing the class prediction values may be used, but examples of which are not limited thereto. The minority class prediction model may be modified in various ways, for example as described in detail below with reference to FIG. 6.

As described above, the computing device 100 may classify a class type of an object in the input image 110 as a majority class or a minority class and apply a class prediction model suitable for each class type, thereby improving the accuracy in classifying a class of the object. The computing device 100 may also improve the accuracy of class classification by performing the class classification robustly against the class imbalance through the process described above. For example, the computing device 100 may distinguish the minority class that is difficult to learn in an inference process and determine the class of the object using the minority class prediction model suitable for the inference of the minority class, thereby improving the prediction accuracy for the minority class that may be a cause of the class imbalance. The computing device 100 may also solve such a class imbalance issue in the inference process of inferring the class of the object and may not require additional training.

Figure 2:
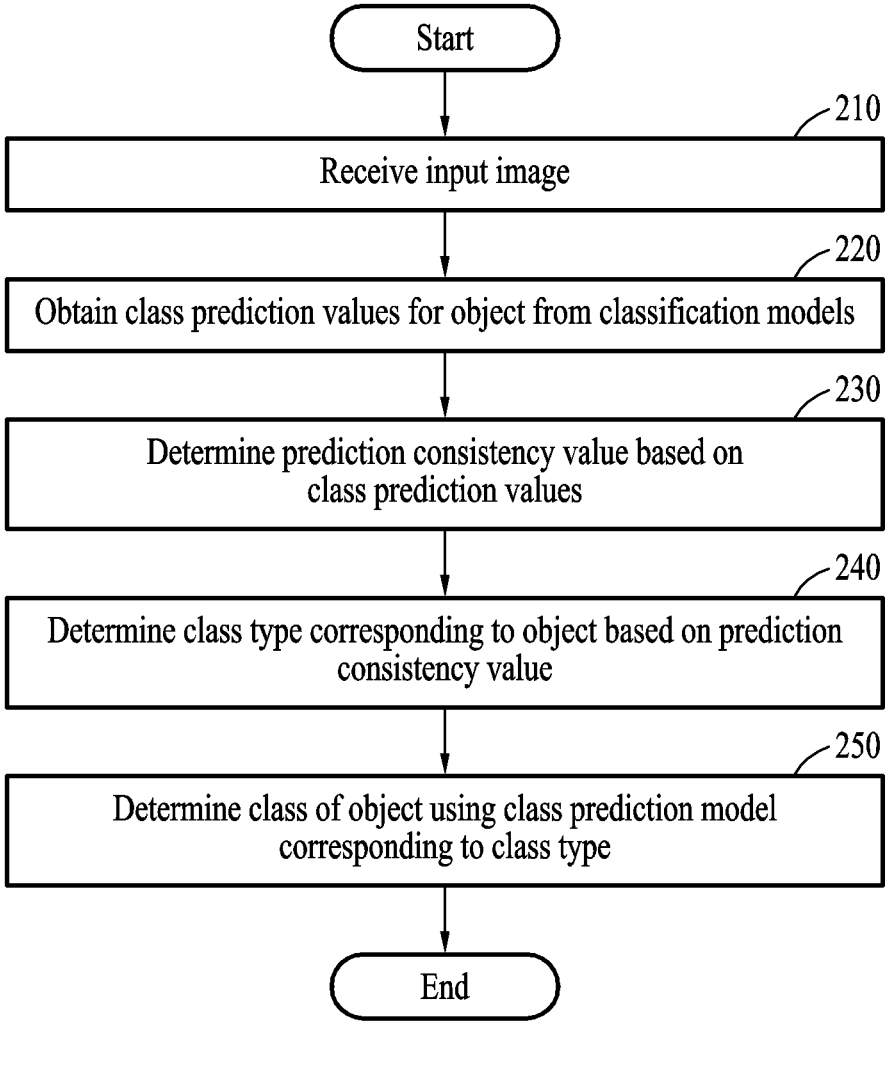
FIGS. 2 and 3 illustrate an example of a classification method of classifying objects in an image, in accordance with one or more example embodiments.
Figure 3:
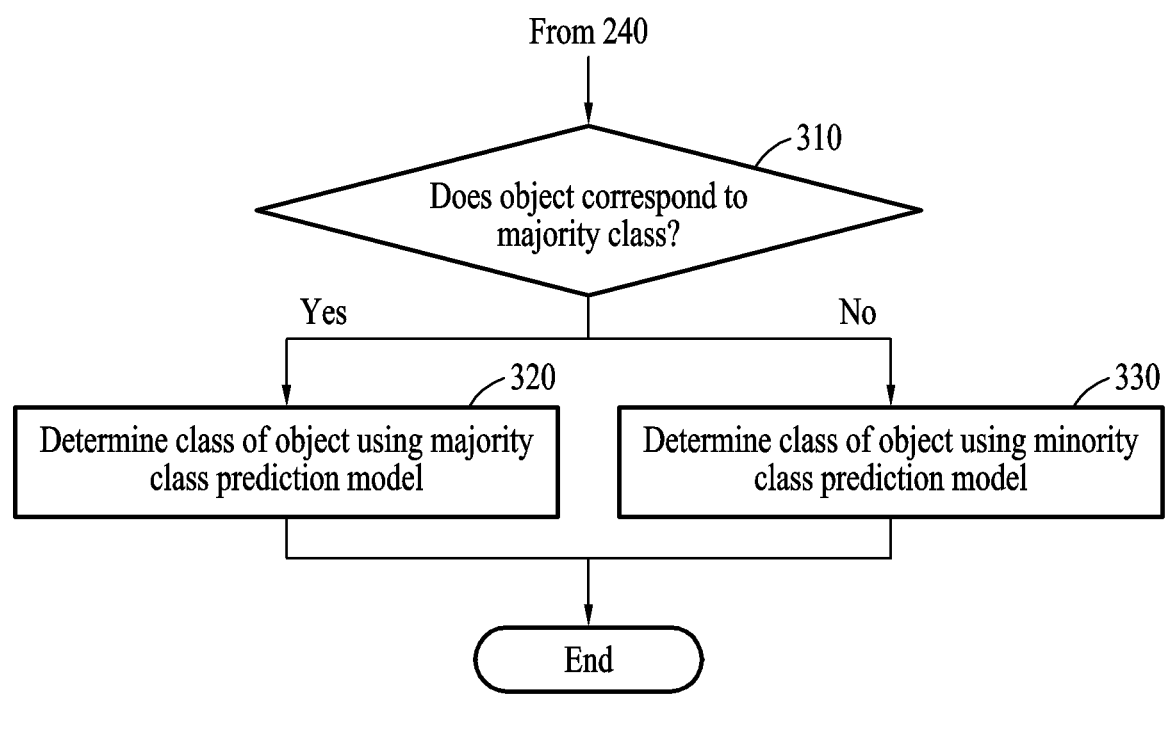

FIGS. 2 and 3 illustrate an example of a classification method of classifying objects in an image according to one or more example embodiments.

In an example embodiment, some of operations to be described hereinafter with reference to FIGS. 2 and 3 may be performed simultaneously or in parallel with other operations, and the order of the operations may be changed. In addition, some of the operations may be omitted, or another operation may be additionally performed. A classification method of classifying objects in an image may be performed by the computing device (e.g., the computing device 100 of FIG. 1, an electronic device 700 of FIG. 7, and an electronic device 1100 of FIG. 11) described herein.

Referring to FIG. 2, in operation 210, the computing device may receive an input image. The input image may include an object that is subject to class classification. The computing device may perform image preprocessing on the input image.

In operation 220, the computing device may obtain class prediction values for the object in the input image from a plurality of classification models to which the input image is input. The input image may be input to each of the classification models, and each of the classification models may output a class prediction value corresponding to the input image.

The classification models may be trained with the same training dataset by different numbers of times of training. For example, the classification models may include a first classification model (the number of times of training: once) obtained when an untrained initial classification model has completed once a training process with an entire training dataset, a second classification model (the number of times of training: twice) obtained when the first classification model has additionally completed the training process with the entire training dataset once again, and a third classification model (the number of times of training: thrice) obtained when the second classification model has additionally completed the training process with the entire training dataset once again. In this example, performing the training process once may correspond to one epoch, and one epoch may indicate that forward pass and backward pass of a backpropagation algorithm are completed for the entire training dataset.

In operation 230, the computing device may determine a prediction consistency value based on the class prediction values. The computing device may determine a mode class prediction value with the highest frequency among the class prediction values obtained from the classification models and determine the prediction consistency value based on a matching frequency between the class prediction values and the mode class prediction value. The matching frequency may indicate how many class prediction values are the same (or match) as the mode class prediction value among the class prediction values. The computing device may determine the prediction consistency value by dividing the matching frequency between the class prediction values and the mode class prediction value by a total number of class prediction values. The total number of class prediction values may correspond to a total number of classification models.

In operation 240, the computing device may determine a class type corresponding to the object based on the prediction consistency value. The computing device may classify the class type of the object based on whether the prediction consistency value satisfies a defined criterion. For example, the computing device may classify the class type of the object as a majority class or a minority class based on a result of comparing the prediction consistency value and a threshold value. However, the class type may vary and is not limited to the major class and the minor class.

In operation 250, the computing device may determine a class of the object using a class prediction model corresponding to the determined class type of the object. In an example embodiment, when the class type of the object corresponds to a first class type, the computing device may determine the class of the object based on a class prediction value output for the object from a first class prediction model. The first class prediction model may be a classification model that exclusively classifies the first class type. When the class type of the object corresponds to a second class type that is different from the first class type, the computing device may determine the class of the object based on a class prediction value output for the object from a second class prediction model different from the first class prediction model. The second class prediction model may be a classification model that exclusively classifies the second class type. There may be more class types in addition to the first class type and the second class type, and there may also be more class prediction models accordingly.

Referring to FIG. 3, in operation 240, the computing device may classify the class type corresponding to the object as one of the majority class and the minority class based on the prediction consistency value. The computing device may determine the class type corresponding to the object to be the majority class or the minority class based on the prediction consistency value and the threshold value. In response to the prediction consistency value being greater than the threshold value, the computing device may determine the class type corresponding to the object as the majority class. In response to the prediction consistency value not being greater than (or less than or equal to) the threshold value, the computing device may determine the class type corresponding to the object as the minority class.

In operation 310, the computing device may determine whether the class type corresponding to the object corresponds to the majority class. In operation 320, when the class type of the object corresponds to the majority class ("Yes" in operation 310), the computing device may determine the class of the object using the majority class prediction model. The computing device may determine the class of the object based on a class prediction value output for the object from the majority class prediction model. The computing device may determine the class of the object by using, as the majority class prediction model, an ensemble model of the classification models or a target classification model selected from among the classification models. For example, the computing device may select, as the target classification model, a classification model that exhibits the best classification performance for the majority class in the training process of the classification models or a classification model (e.g., a classification model with a small number of times of training) that is derived at an early stage of training. The computing device may determine a final class of the object based on the class prediction value output from the majority class prediction model.

In operation 330, when the class type of the object corresponds to the minority class ("No" in operation 310), the computing device may determine the class of the object using the minority class prediction model. The computing device may determine the class of the object based on a class prediction value output for the object from the minority class prediction model. The computing device may determine the class of the object by using, as the minority class prediction model, an ensemble model (e.g., with multiple diverse models using different training data sets, or modeling algorithms) of classification models (e.g., classification models with a great number of times of training) that are derived in a later stage of training or a target classification model selected from among the classification models. For example, the computing device may select, as the target classification model, a classification model that exhibits the best classification performance for the minority class in the training process of the classification models. The computing device may determine a final class of the object based on the class prediction value output from the minority class prediction model.

Figure 4:
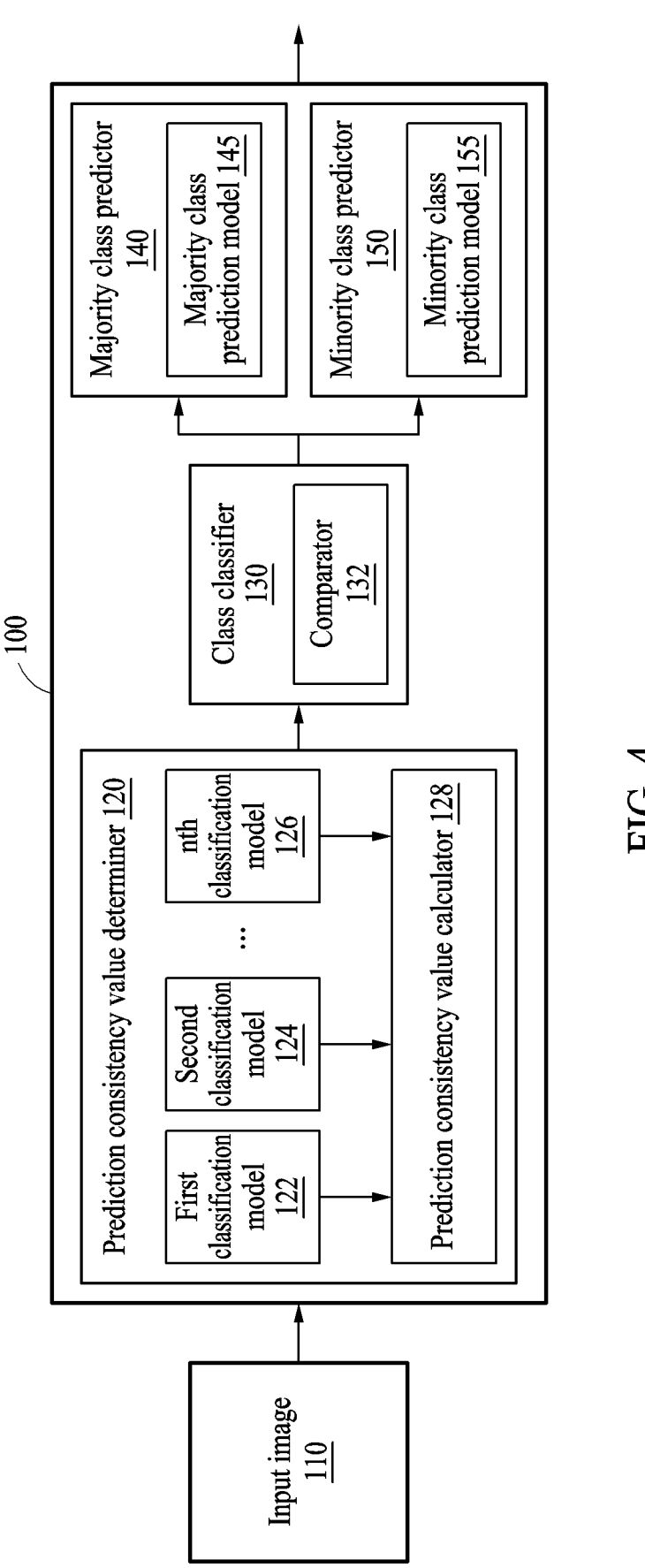
FIG. 4 illustrates an example of an operation of a computing device with object classification, in accordance with one or more example embodiments.

FIG. 4 illustrates an example of an operation of a computing device with object classification according to one or more example embodiments.

Referring to FIG. 4, the computing device 100 may include the prediction consistency value determiner 120, the class classifier 130, the majority class predictor 140, and the minority class predictor 150.

The prediction consistency value determiner 120 may include a plurality of classification models (e.g., a first classification model 122, a second classification model 124, . . . , and an nth classification model 126) that is trained by different numbers of times of training, and a prediction consistency value calculator 128. The prediction consistency value determiner 120 may obtain class prediction values for an object in an input image 110 using the classification models 122, 124, . . . , and 126. The prediction consistency value determiner 120 may store the classification models 122, 124, . . . , and 126 generated each epoch in a training process. There may be two or more classification models.

In an example embodiment, the first classification model 122 may be a classification model obtained when an initial classification model that has not been trained yet has completed training with an entire training dataset once, and the second classification model 124 may be a classification model obtained when the initial classification model has completed training with the entire training dataset twice. The nth classification model 126 may be a classification model obtained as the training with the entire training dataset has been completed n times, and may correspond to a classification model for which the training has finally been completed. The first classification model 122, the second classification model 124, . . . , and the nth classification model 126 may each be a classification model trained every epoch. The first classification model 122, the second classification model 124, . . . , and the nth classification model 126 may each output a class prediction value for the object by using the input image 110 as an input. The classification models 122, 124, . . . , and 126 described herein may collectively refer to all classification models from the first classification model 122 to the nth classification model 126 which is the last classification model.

The prediction consistency value calculator 128 may determine a prediction consistency value based on the class prediction values output from the classification models 122, 124, and 126. The prediction consistency value calculator 128 may determine a mode class prediction value with the highest frequency among the class prediction values obtained from the classification models 122, 124, and 126. The prediction consistency value calculator 128 may determine the prediction consistency value by dividing a matching frequency between the class prediction values and the mode class prediction value by a total number of class prediction values. The prediction consistency value calculator 128 may determine the prediction consistency value according to Equation 1 below, for example.

$$z = \frac{\sum_{i=1}^{n} \sigma(f_i(x) == c_{most})}{n} \qquad \text{Equation 1}$$

In Equation 1, z denotes a prediction consistency value, and n denotes a total number of class prediction values. $f_i(x)$ denotes a class prediction value output from an ith classification model, in which i denotes a natural number from 1 to n. $c_{most}$ denotes a mode class prediction value that is the most frequently predicted among the class prediction values. According to Equation 1, the prediction consistency value may be defined as a value indicating how many class prediction values output from the classification models 122, 124, and 126 match the mode class prediction value $c_{most}$ among the class prediction values, and may have a value between 0 and 1. When the class prediction value $f_i(x)$ of the ith classification model and the mode class prediction value $c_{most}$ are the same (or match), 1 may be counted. In contrast, when they are different from each other, 0 may be counted. A value obtained by dividing, by a total number n of class prediction values, a total sum of count values that are based on whether a class prediction value of each of all the classification models and the mode class prediction value $c_{most}$ match or not may correspond to the prediction consistency value z.

The prediction consistency value determiner 120 may transmit the prediction consistency value and the input image 110 to the class classifier 130. The class classifier 130 may classify a class type of an object in the input image 110 based on the prediction consistency value determined by the prediction consistency value calculator 128. The class classifier 130 may classify one having a high prediction consistency value as a majority class, and classify one having a low prediction consistency value as a minority class. The class classifier 130 may include a comparator 132. The comparator 132 may compare the prediction consistency value and a threshold value that is a reference for classifying the class type. The comparator 132 may determine whether the prediction consistency value is greater than the threshold value. The comparator 130 may determine the class type of the object as the majority class when the prediction consistency value is greater than the threshold value, and may determine the class type of the object as the minority class when the prediction consistency value is not greater than the threshold value.

When the class type of the object is determined as the majority class, the majority class predictor 140 may determine a class of the object using a majority class prediction model 145 which is a model for class prediction for the majority class. The majority class prediction model 145 may be, for example, an ensemble model of the classification models 122, 124, and 126 or a classification model selected from among the classification models 122, 124, and 126. For example, when the majority class prediction model 145 is the ensemble model, the majority class predictor 140 may determine the class of the object based on an output value (e.g., a feature vector) output from the ensemble model. For example, when one of the classification models 122, 124, and 126 is selected as the majority class prediction model 145, the majority class predictor 140 may determine the class of the object based on a class prediction value (e.g., a feature vector) output from the selected classification model. However, the form of the majority class prediction model 145 is not limited thereto, and the majority class prediction model 145 may be modified in various ways.

When the class type of the object is determined as the minority class, the minority class predictor 150 may determine the class of the object using a minority class prediction model 155 which is a model for class prediction for the minority class. For example, when one of the classification models 122, 124, and 126 is selected as the minority class prediction model 155, the minority class predictor 150 may determine the class of the object based on a class prediction value (e.g., a feature vector) output from the selected classification model. From among the classification models 122, 124, and 126, a classification model having the best classification performance for the minority class in the training process may be selected as the minority class prediction model 155. However, the form of the minority class prediction model 155 is not limited thereto, and the minority class prediction model 155 may be modified in various ways.

As described above, the computing device 100 may classify a class type of an object into a majority class and a minority class that is difficult to learn and perform object class classification using a class prediction model optimized for each class type, thereby increasing the accuracy in the class classification.

Figure 5:
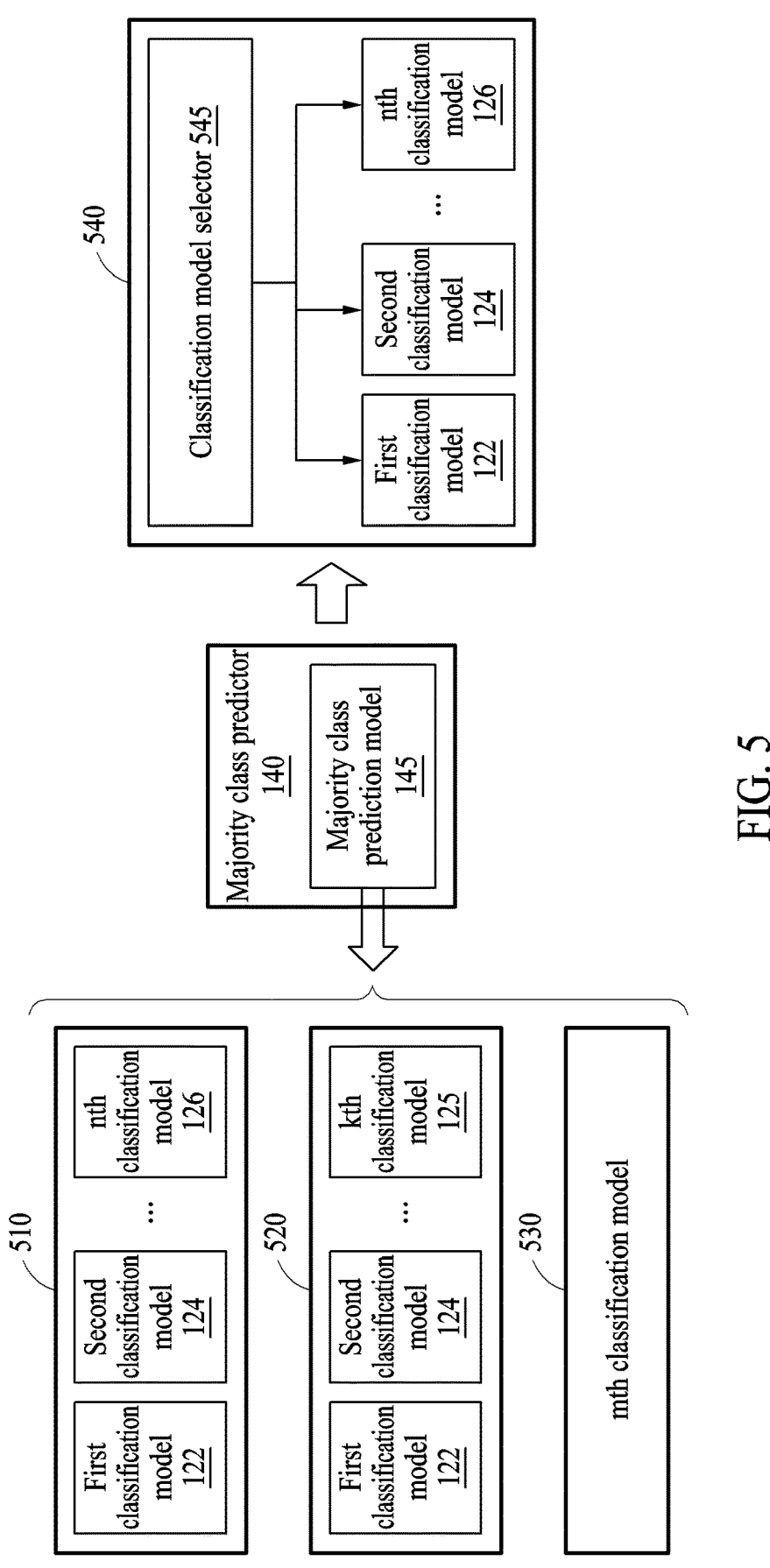
FIG. 5 illustrates examples of a majority class predictor, in accordance with one or more example embodiments.

FIG. 5 illustrates various modified examples of a majority class predictor according to one or more example embodiments.

Referring to FIG. 5, the majority class predictor 140 and the majority class prediction model 145 may be modified into various forms. For example, an ensemble model 510 of all the classification models 122, 124, and 126 that output respective class prediction values for an object in an input image, an ensemble model 520 of some of the classification models 122, 124, and 126 (e.g., the first classification model 122, the second classification model 124, and a kth classification model 125), or one specific classification model 530 (e.g., an mth classification model) of the classification models 122, 124, and 126 may be used as the majority class prediction model 145. The ensemble model 510 may provide stable performance in various environments. The ensemble model 520 may be, for example, an ensemble model of classification models with a small number of times of training (e.g., classification models with the number of epochs being five or fewer times). The classification model 530 may correspond to a classification model with a small number of times of training (e.g., any one among classification models with the number of epochs being five or fewer times) or a classification model having the best classification performance for a majority class in a training process.

In an example embodiment, the majority class predictor 140 may be modified into a majority class predictor 540 including a classification model selector 545 that selects a specific classification model from among all the classification models 122, 124, and 126 as the majority class prediction model 145. The classification model selector 545 may select, as the majority class prediction model 145, a classification model providing the best classification performance for a class type of an object from among all the classification models 122, 124, and 126.

Figure 6:
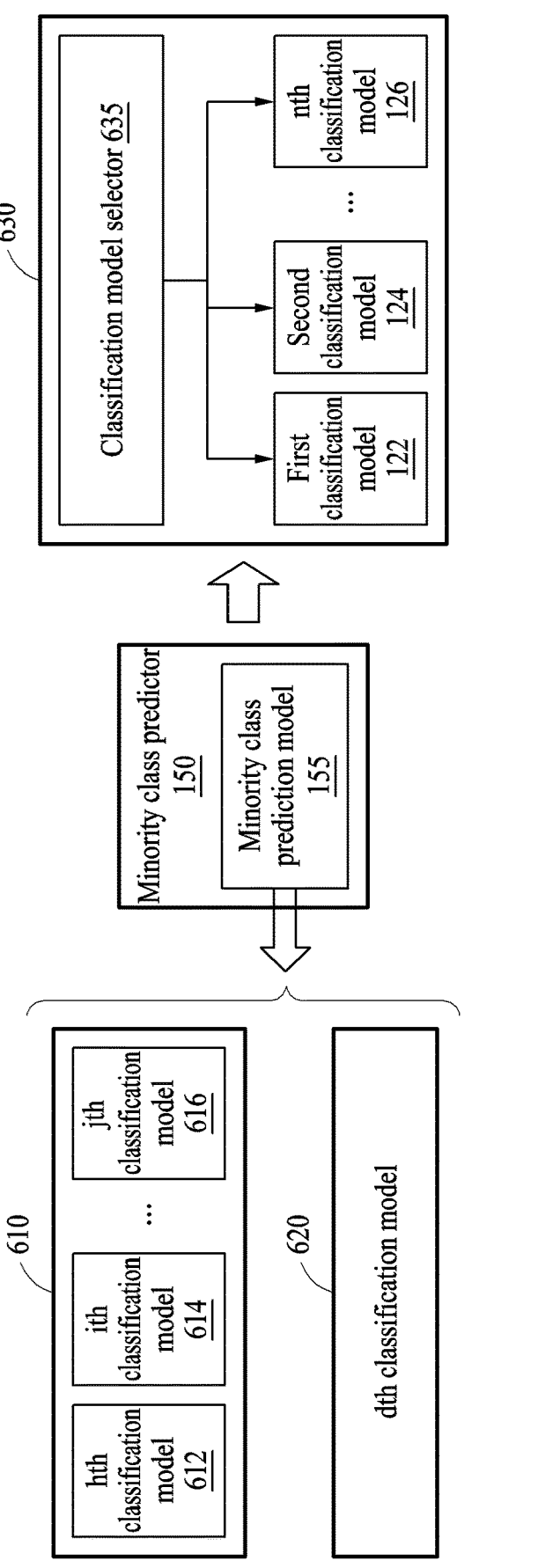
FIG. 6 illustrates examples of a minority class predictor, in accordance with one or more example embodiments.

FIG. 6 illustrates various modified examples of a minority class predictor according to one or more example embodiments.

Referring to FIG. 6, the minority class predictor 150 and the minority class prediction model 155 may be modified into various forms. For example, an ensemble model 610 of some (e.g., an hth classification model 612, an ith classification model 614, . . . , and a jth classification model 616) of all the classification models 122, 124, and 126 that output respective class prediction values for an object in an input image, or one specific classification model 620 (e.g., a dth classification model) among the classification models 122, 124, and 126 may be used as the minority class prediction model 155. The ensemble model 610 may be, for example, an ensemble model of classification models having a great number of times of training. The ensemble model 610 may provide stable performance in various environments. The classification model 620 may correspond to a classification model having the best classification performance for a minority class in a training process.

In an example embodiment, the minority class predictor 150 may be modified into a minority class predictor 630 including a classification model selector 635 that selects a specific classification model from among all the classification models 122, 124, and 126 as the minority class prediction model 155. The classification model selector 635 may select, as the minority class prediction model 155, a classification model providing the best classification performance for a class type of an object from among all the classification models 122, 124, and 126.

Figure 7:
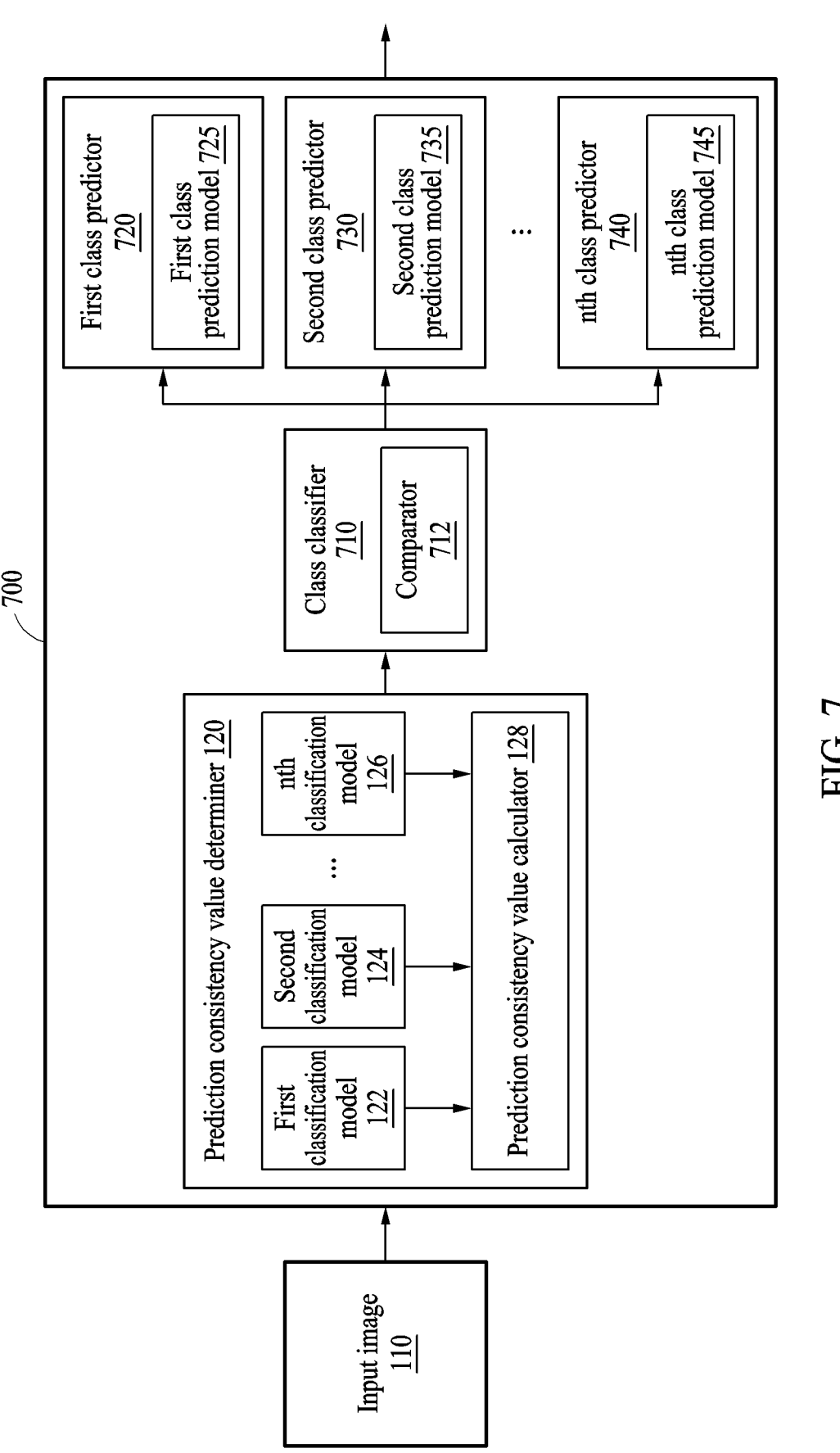
FIG. 7 illustrates another example of an operation of a computing device with object classification, in accordance with one or more example embodiments.

FIG. 7 illustrates another example of an operation of a computing device with object classification according to one or more example embodiments.

Referring to FIG. 7, the computing device 700 may include a prediction consistency value determiner 120, a class classifier 710, and a plurality of class predictors (e.g., a first class predictor 720, a second class predictor 730, . . . , and an nth class predictor 740). Each of the prediction consistency value determiner 120, the class classifier 710, and the plurality of class predictors are representative of one or more processors and memories storing instructions that configure the respective one or more operations of the prediction consistency value determiner 120, the class classifier 710, and (each of) the plurality of class predictors described herein. Respective operations of two or any combination of two or more of the prediction consistency value determiner 120, the class classifier 710, and each of the plurality of class predictors may be performed by respective one or more processors or respective processors and such memories.

The prediction consistency value determiner 120 may include a plurality of classification models (e.g., the classification models 122, 124, and 126) and a prediction consistency value calculator 128. The prediction consistency value calculator 128 may calculate a prediction consistency value based on class prediction values output for an input image 110 from the classification models 122, 124, and 126. What has been described above about the prediction consistency value determiner 120 may also be applicable hereto, and thus a repeated description thereof will be omitted.

The class classifier 710 may classify a class type of an object in the input image 110 based on the prediction consistency value. The class classifier 710 may include a comparator 712 that compares the prediction consistency value and a threshold value to classify the class type of the object. The class classifier 710 may classify the class type of the object as one of various class types based on a result of the comparison performed by the comparator 712. For example, when the prediction consistency value is greater than a first threshold value (e.g., 0.725), the class classifier 710 may classify the class type of the object as a first class type (e.g., a majority class). When the prediction consistency value is less than a second threshold value (e.g., 0.5), the class classifier 710 may classify the class type of the object as a third class type (e.g., a background class or a normal class). The second threshold value may be less than the first threshold value. When the prediction consistency value is between the second threshold value and the first threshold value, the class classifier 710 may classify the class type of the object as a second class type (e.g., an intermediate class or a balanced class). There is no limit to the number of class types into which the class classifier 710 may classify, and the class classifier 710 may classify the class type of the object as one of maximally n class types (in which n is a natural number greater than or equal to 3).

When the class type of the object is determined as the first class type, the first class predictor 720 may determine a class of the object using a first class prediction model 725. For example, as the first class prediction model 725, a classification model having the best classification performance for the first class type in the training process among the classification models 122, 124, and 126 may be implemented.

When the class type of the object is determined as the second class type, the second class predictor 730 may determine the class of the object using a second class prediction model 735. For example, as the second class prediction model 735, an ensemble model of the classification models 122, 124, and 126 may be implemented.

When the class type of the object is determined as an nth class type, the nth class predictor 740 may determine the class of the object using an nth class prediction model 745. For example, as the nth class prediction model 745, a classification model having the best classification performance for the nth class type in the training process among the classification models 122, 124, and 126 may be implemented.

Figure 8:
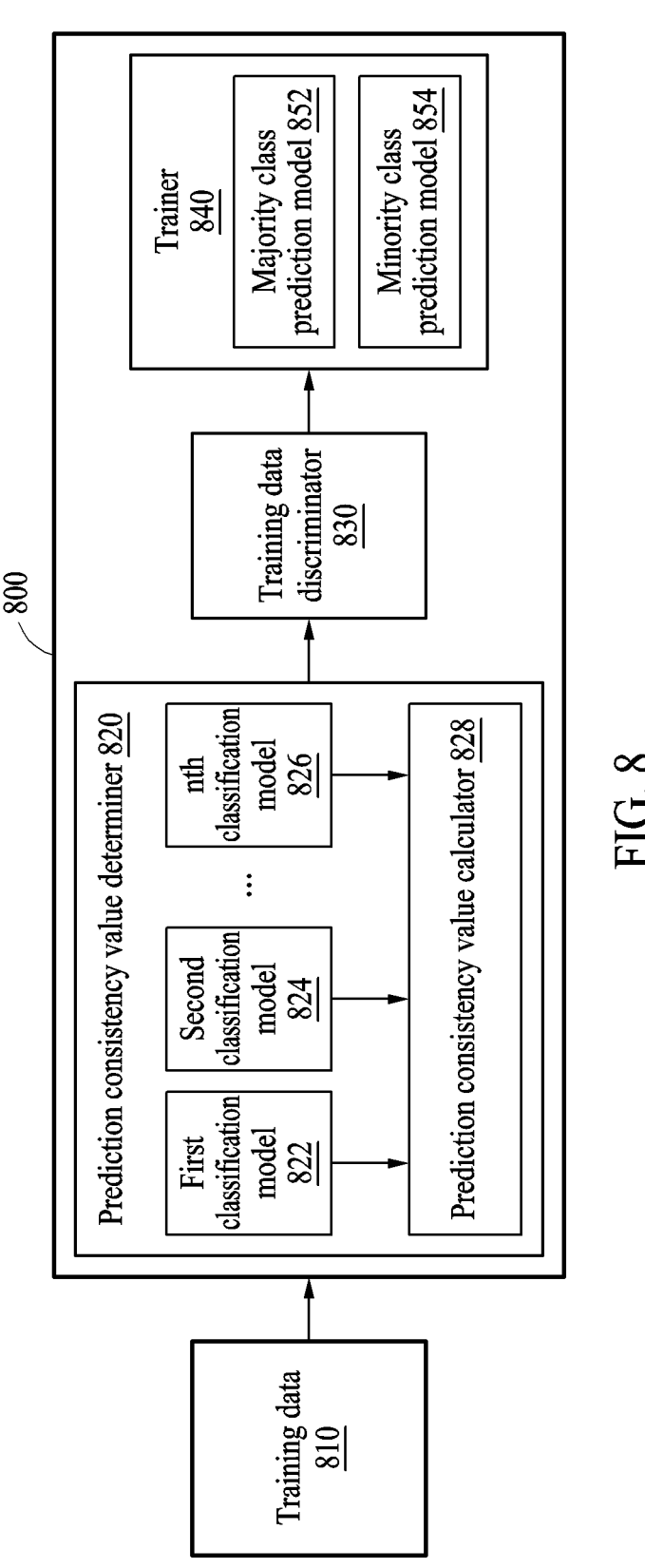
FIG. 8 illustrates an example of training a classification model based on a prediction consistency value, in accordance with one or more example embodiments.

FIG. 8 illustrates an example of training a classification model based on a prediction consistency value according to one or more example embodiments.

Referring to FIG. 8, a computing device 800 may include a prediction consistency value determiner 820, a training data discriminator 830, and a trainer 840. Each of the prediction consistency value determiner 820, the training data discriminator 830, and the trainer 840 are representative of one or more processors and memories storing instructions that configure the respective one or more operations of the prediction consistency value determiner 820, the training data discriminator 830, and the trainer 840 described herein. Respective operations of two or any combination of two or more of the prediction consistency value determiner 820, the training data discriminator 830, and the trainer 840 may be performed by respective one or more processors or respective processors and such memories.

The prediction consistency value determiner 820 may determine a prediction consistency value for given training data 810. The training data 810 may be, for example, an image including an object. The prediction consistency value determiner 820 may include a plurality of classification models (e.g., a first classification model 822, a second classification model 824, . . . , and an nth classification model 826) and a prediction consistency value calculator 828. The classification models 822, 824, and 826 may be models trained by different numbers of times of training or different numbers of epochs. The prediction consistency value calculator 828 may calculate the prediction consistency value based on class prediction values output from the classification models 822, 824, and 826 in response to the training data 810.

The training data discriminator 830 may determine a class type corresponding to an object in the training data 810 based on the prediction consistency value. In an example embodiment, the training data discriminator 830 may compare the prediction consistency value and a threshold value and classify the class type of the object as a majority class or a minority class based on a result of the comparison. The class type of the object may be classified as the majority class when the prediction consistency value is greater than the threshold value, and as the minority class when the prediction consistency value is not greater than the threshold value.

The trainer 840 may train a majority class prediction model 852 and a minority class prediction model 854 based on the class type of the object. When the class type of the object is classified as the majority class by the training data discriminator 830, the trainer 840 may train the majority class prediction model 852 based on the training data 810. The training may include defining, as a loss, a difference between a class prediction value output for the training data 810 from the majority class prediction model 852 and a class value defined in the training data 810, and adjusting parameters (e.g., a connection weight and a bias) of the majority class prediction model 852 such that the loss is reduced.

When the class type of the object is classified as the minority class, the trainer 840 may train the minority class prediction model 854 based on the training data 810. The training may include defining, as a loss, a difference between a class prediction value output for the training data 810 from the minority class prediction model 854 and a class value defined in the training data 810, and adjusting parameters (e.g., a connection weight and a bias) of the minority class prediction model 854 such that the loss is reduced.

The computing device 800 may optimize the parameters of the majority class prediction model 852 and the minority class prediction model 854 by iteratively performing the forgoing process on numerous pieces of training data. In an example embodiment, the majority class prediction model 852 that has been trained may be implemented as the majority class prediction model 145 of FIG. 4, and the minority class prediction model 854 that has been trained may be implemented as the minority class prediction model 155 of FIG. 4.

Figure 9:
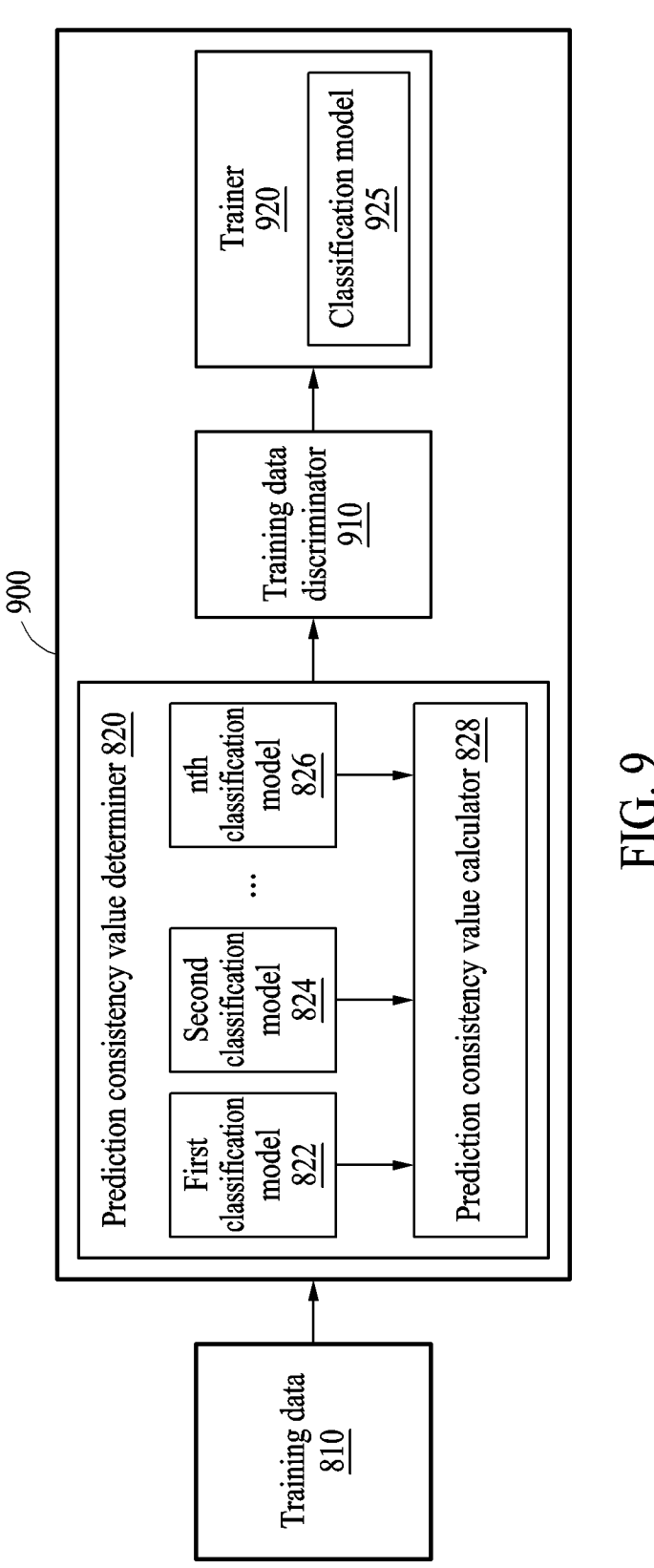
FIG. 9 illustrates an example of training a classification model based on a prediction consistency value, in accordance with one or more example embodiments.

FIG. 9 illustrates another example of training a classification model based on a prediction consistency value according to one or more example embodiments.

Referring to FIG. 9, a computing device 900 may include a prediction consistency value determiner 820, a training data discriminator 910, and a trainer 920. Each of the prediction consistency value determiner 820, the training data discriminator 910, and the trainer 920 are representative of one or more processors and memories storing instructions that configure the respective one or more operations of the prediction consistency value determiner 820, the training data discriminator 910, and the trainer 920 described herein. Respective operations of two or any combination of two or more of the prediction consistency value determiner 820, the training data discriminator 910, and the trainer 920 may be performed by respective one or more processors or respective processors and such memories. The computing device 900 may perform active learning based on a prediction consistency value determined by the prediction consistency value determiner 820. The computing device 900 may perform learning or training by selecting training data to be implemented for the learning (or training) based on a prediction consistency value.

The prediction consistency value determiner 820 may determine a prediction consistency value for given training data 810, for which reference may be made to what has been described above with reference to FIG. 8, and a repeated description will be omitted.

The training data discriminator 910 may determine whether the training data 810 is a sample that is difficult to be classified, based on the prediction consistency value. For example, when the prediction consistency value for the training data 810 is not greater than a threshold value, the training data discriminator 910 may classify the training data 810 as such a difficult sample. When the prediction consistency value is greater than the threshold value, the training data 810 may not be used to train a classification model 925.

The trainer 920 may train the classification model 925 based on a result of the classification performed on the training data 810 by the training data discriminator 910. The trainer 920 may train the classification model 925 using only training data classified as the difficult sample by the training data discriminator 910. The training may include defining, as a loss, a difference between a class prediction value output for the training data 810 from the classification model 925 and a class value defined in the training data 810, and adjusting parameters (e.g., a connection weight and a bias) of the classification model 925 such that the loss is reduced. The training may be performed as training data that is difficult for class classification is selected as described above, and as a result of the training, the classification model 925 may have a classification performance robust against an object that is difficult for class classification.

Figure 10:
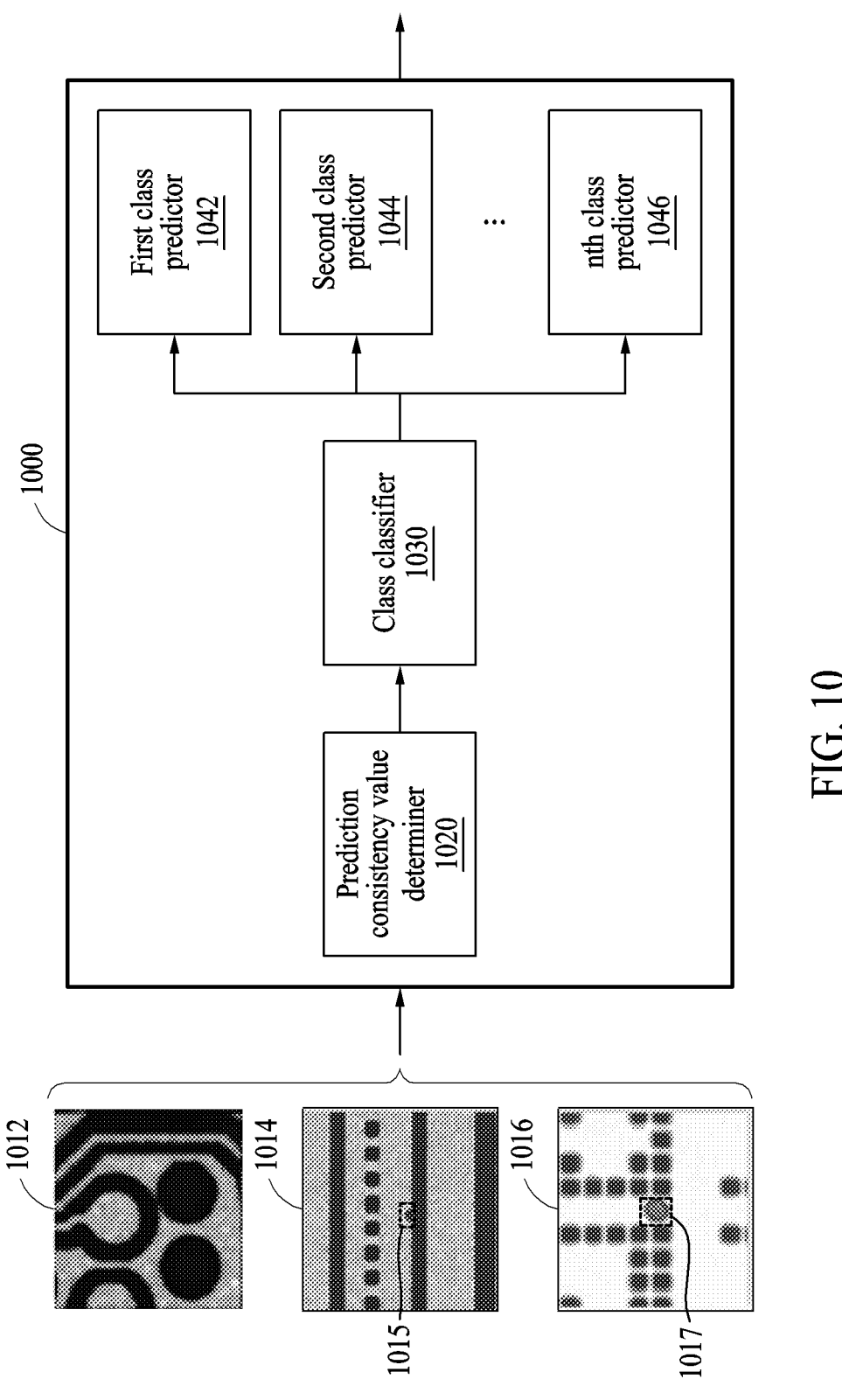
FIG. 10 illustrates an example of determining a wafer defect through image object classification in a semiconductor manufacturing process, in accordance with one or more example embodiments.

FIG. 10 illustrates an example of determining a wafer defect through image object classification in a semiconductor manufacturing process according to one or more example embodiments.

The example embodiments described herein may be applied to determine a wafer defect through image object classification in a semiconductor manufacturing process. In the semiconductor manufacturing process, a wafer may have a defect (e.g., a scratch, a float, a pinhole, a loss, excessive etching, a burnout, etc.). In these instances, to detect the wafer with the defect, wafer images 1012, 1014, and 1016 obtained by capturing an image of a surface of a wafer may be input to an electronic device (or system) 1000. For example, the wafer image 1012 of a wafer in a normal state, the wafer image 1014 of a wafer having a defect 1015, and the wafer image 1016 of a wafer having a defect 1017 may be input to the electronic device 1000.

The computing device 1000 may include a prediction consistency value determiner 1020, a class classifier 1030, and a plurality of class predictors (e.g., a first class predictor 1042, a second class predictor 1044, . . . , and an nth class predictor 1046). There may be two or more class predictors. Each of the prediction consistency value determiner 1020, the class classifier 1030, and the plurality of class predictors are representative of one or more processors and memories storing instructions that configure the respective one or more operations of the prediction consistency value determiner 1020, the class classifier 1030, and (each of) the plurality of class predictors described herein. Respective operations of two or any combination of two or more of the prediction consistency value determiner 1020, the class classifier 1030, and each of the plurality of class predictors may be performed by respective one or more processors or respective processors and such memories.

When the wafer image 1012 is input to the computing device 1000, the wafer image 1012 may be input to classification models that are included in the prediction consistency value determiner 1020 and are trained by different numbers of times of training, and the classification models may output class prediction values in response to the wafer image 1012. The prediction consistency value determiner 1020 may determine a prediction consistency value based on the class prediction values, and the class classifier 1030 may determine a class type corresponding to a state of the wafer shown in the wafer image 1012 based on the prediction consistency value. When the class type of the wafer image 1012 is determined to correspond to the normal state, the first class predictor 1042 may determine a final class of the wafer image 1012 using a first class prediction model.

When the wafer image 1014 is input to the computing device 1000, the wafer image 1014 may be input to classification models that are included in the prediction consistency value determiner 1020 and are trained by different numbers of times of training, and the classification models may output class prediction values in response to the wafer image 1014. The prediction consistency value determiner 1020 may determine a prediction consistency value based on the class prediction values, and the class classifier 1030 may determine a class type corresponding to a state of the wafer shown in the wafer image 1014 based on the prediction consistency value. When the class type of the wafer image 1014 is determined to correspond to a first defect state, the second class predictor 1044 may determine a final class of the wafer image 1014 using a second class prediction model that has the best classification performance for the first defect state.

When the wafer image 1016 is input to the computing device 1000, the wafer image 1016 may be input to classification models that are included in the prediction consistency value determiner 1020 and are trained by different numbers of times of training, and the classification models may output class prediction values in response to the wafer image 1016. The prediction consistency value determiner 1020 may determine a prediction consistency value based on the class prediction values, and the class classifier 1030 may determine a class type corresponding to a state of the wafer shown in the wafer image 1016 based on the prediction consistency value. When the class type of the wafer image 1016 is determined to correspond to a second defect state, the third class predictor may determine a final class of the wafer image 1016 using a third class prediction model that has the best classification performance for the second defect state. There may be a plurality of class types relating to a defect state.

The computing device 1000 may determine that the wafer image 1012 is normal and determine that the wafer image 1014 and the wafer image 1016 include defects. When detecting a wafer including a defect based on an image of the wafer, the computing device 1000 may transmit a result of the detection to the outside.

Figure 11:
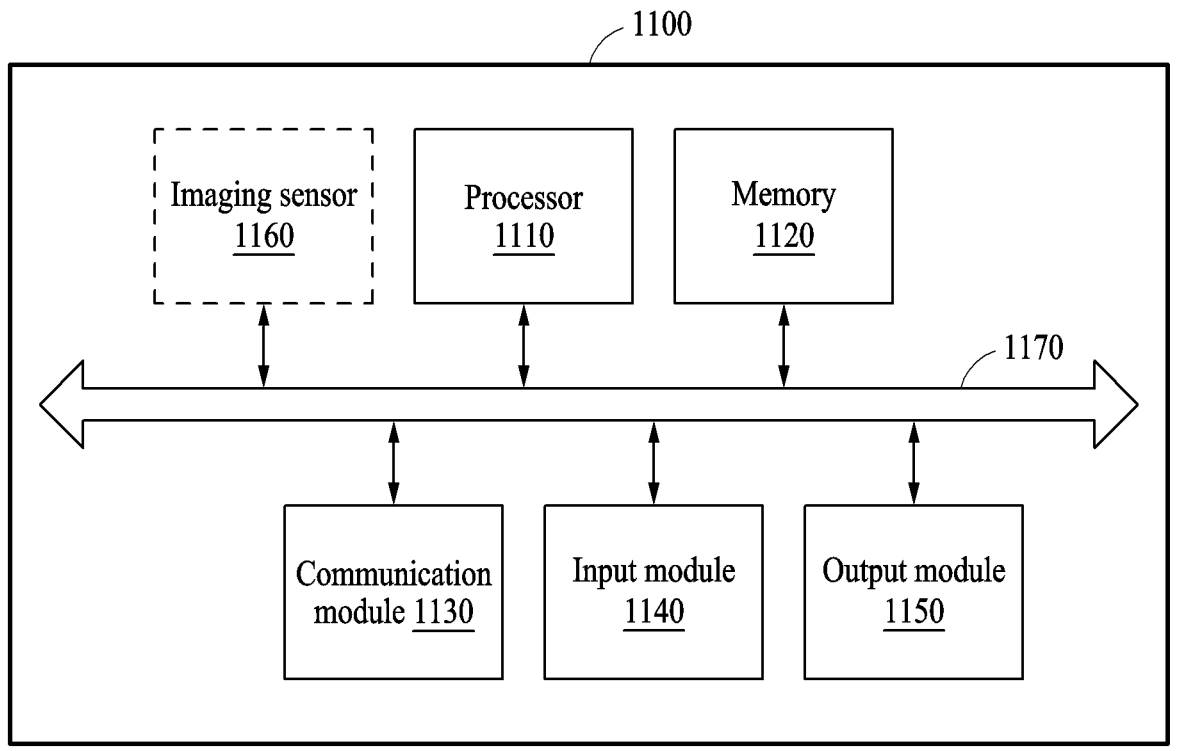
FIG. 11 illustrates an example electronic device with object classification, in accordance with one or more example embodiments.

FIG. 11 illustrates an example configuration of a computing device with object classification according to one or more example embodiments.

Referring to FIG. 11, an electronic device 1100 may be a device configured to classify an object in an input image and determine a class of the object. The electronic device 1100 may correspond to the computing device 100 of FIG. 1, the computing device 700 of FIG. 7, and the computing device 1000 of FIG. 10. The electronic device 1100 may include a processor 1110, a memory 1120, a communication module 1130, an input module 1140, an output module 1150, and an imaging sensor 1160. The components of the electronic device 1100 may communicate with each other via a communication bus 1170. In an example embodiment, some of these components (e.g., the input module 1140 and the output module 1150) may be omitted or another component (e.g., an image acquisition module) may be added to the electronic device 1100.

The processor 1110 may control at least one other component (e.g., a hardware or software component) of the electronic device 1100 and may perform various types of data processing or computation. In an example embodiment, as at least a part of the data processing or computation, the processor 1110 may store instructions or data received from another component (e.g., the communication module 1130) in the memory 1120, process the instructions or data stored in the memory 1120, and store resulting data in the memory 1120.

The processor 1110 may include, for example, a main processor (e.g., a central processing unit (CPU) or an application processor (AP)) or an auxiliary processor (e.g., a graphics processing unit (GPU), a neural processing unit (NPU), an image signal processor (ISP), a sensor hub processor, or a communication processor (CP)) that is operable independently of, or in conjunction with, the main processor.

The memory 1120 may store various pieces of data used by a component (e.g., the processor 1110 or the communication module 1130) of the electronic device 1100. The data may include, for example, a program (e.g., an application), and input data or output data associated with instructions for the program. The memory 1120 may store the instructions executable by the processor 1110. The memory 1120 may include a volatile memory or a non-volatile memory.

The communication module 1130 may support the establishment of a direct (or wired) communication channel or a wireless communication channel between the electronic device 1100 and another device, and support the communication through the established communication channel. The communication module 1130 may include a communication circuit for performing a communication function. The communication module 1130 may include a communication processor that is operable independently of the processor 1110 and supports direct (e.g., wired) communication or wireless communication. The communication module 1130 may include a wireless communication module (e.g., a Bluetooth communication module, a cellular communication module, a Wi-Fi communication module, a short-range wireless communication module, or a global navigation satellite system (GNSS) communication module) that performs wireless communication, or a wired communication module (e.g., a local area network (LAN) communication module or a power line communication module).

The input module 1140 may receive, from the outside (e.g., a user), a command or data to be used by a component (e.g., the processor 1110) of the electronic device 1100. The input module 1140 may include an input component circuit to receive an input from a user. The input module 1140 may include a touch recognition circuit for recognizing keys (e.g., buttons) and/or touches on the screen.

The output module 1150 may provide visual, auditory, or tactile feedback to the outside of the electronic device 1100. The output module 1150 may include, for example, a display module such as a liquid crystal display (LCD), an organic light-emitting diode (OLED) display, a hologram device, and a projector device, and a sound output module that outputs a sound signal to the outside of the electronic device 1100. The display module may further include a control circuit for controlling the driving of the display. The sound output module may include a speaker that reproduces a sound signal, a guide voice, or a notification sound according to a result of object class classification.

The imaging sensor 1160, e.g., a charge-coupled device (CCD) or complementary metal-oxide-semiconductor (CMOS) as non-limiting examples, may be configured to capture an image, e.g., any of the wafer images 1012, 1014, and 1016 described above.

In an example embodiment, when the instructions stored in the memory 1120 are executed by the processor 1110, the processor 1110 may classify a class of an object in an input image (e.g., or an image captured by the imaging sensor 1160). The processor 1110 may receive an input image and obtain class prediction values for the object in the input image from classification models to which the input image is input. The processor 1110 may determine a prediction consistency value based on the class prediction values. The processor 1110 may determine a mode class prediction value with the highest frequency among the class prediction values obtained from the classification models, and determine the prediction consistency value based on a matching frequency between the class prediction values and the mode class prediction value. The processor 1110 may determine a class type corresponding to the object based on the prediction consistency value. For example, the processor 1110 may compare the prediction consistency value and a threshold value, and determine the class type corresponding to the object based on a result of the comparison. In response to the prediction consistency value being greater than the threshold value, the processor 1110 may determine the class type corresponding to the object to be a majority class. In response to the prediction consistency value not being greater than the threshold value, the processor 1110 may determine the class type corresponding to the object to be a minority class. When the class type of the object corresponds to the majority class, the processor 1110 may determine a class of the object based on a class prediction value output for the object from a majority class prediction model.

For example, the processor 1110 may determine the class of the object using, as the majority class prediction model, an ensemble model of the classification models. When the class type of the object corresponds to the minority class, the processor 1110 may determine the class of the object based on a class prediction value output for the object from a minority class prediction model. The processor 1110 may determine the class of the object using, as the minority class prediction model, a target classification model selected from among the classification models. For example, a classification model that exhibits the best classification performance for the minority class in a training process of the classification models may be selected as the target classification model.

The computing devices (100, 700, 1000, 1100), prediction consistency value determiners (120, 820, 1020), prediction consistency value calculators (128, 828), class classifiers (130, 710, 1030), comparators (132, 712), majority class predictor 140, minority class predictor 150, classification model selector 635, plurality of class predictors (720, 730, . . . , 740, 1042, 1044, . . . , 1046), computing devices (800, 900), training data discriminators (830, 910), and trainers (840, 920) described herein and disclosed herein described with respect to FIGS. 1-11 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor implemented method, comprising:
generating a prediction consistency value that indicates a consistency of prediction of an object in an input image with respect to class prediction values for the object in an input image from classification models to which the input image is input; and
identifying a class of the object, including:
in response to a class type being determined, based on the prediction consistency value, of the object being determined to correspond to a majority class, identifying a class of the object based on a corresponding class prediction value output for the object from a majority class prediction model; and
in response to the class type of the object being determined to correspond to a minority class, identifying the class of the object based on another corresponding class prediction value output for the object from a minority class prediction model.

2. The classification method of claim 1, wherein the generating of the prediction consistency value comprises:
determining a mode class prediction value with a highest frequency among the class prediction values generated by the classification models; and
generating the prediction consistency value based on a matching frequency between the class prediction values and the mode class prediction value.

3. The classification method of claim 2, wherein the generating of the prediction consistency value comprises:

generating the prediction consistency value by dividing the matching frequency between the class prediction values and the mode class prediction value by a total number of the class prediction values.

4. The classification method of claim 1, further comprising:
identifying the class type corresponding to the object to be one of the majority class and the minority class based on the prediction consistency value and a threshold value,
wherein the majority class prediction model and the minority class prediction model are different from each other.

5. The classification method of claim 4, further comprising:
in response to a determination that the prediction consistency value is greater than the threshold value, identifying the class type corresponding to the object to be the majority class; and
in response to a determination that the prediction consistency value is not greater than the threshold value, identifying the class type corresponding to the object to be the minority class.

6. The classification method of claim 1, further comprising:
in response to a determination that the object corresponds to the majority class, identifying the class of the object using an ensemble model of the classification models as the majority class prediction model.

7. The classification method of claim 1 further comprising:
in response to a determination that the object corresponds to the majority class, identifying the class of the object using a target classification model selected from among the classification models as the majority class prediction model.

8. The classification method of claim 7, further comprising:
selecting, as the target classification model, a classification model having a best classification performance for the majority class during training of the classification models.

9. The classification method of claim 1, further comprising:
in response to a determination that the object corresponds to the minority class, identifying the class of the object using a target classification model selected from among the classification models as the minority class prediction model.

10. The classification method of claim 9, further comprising:
selecting, as the target classification model, a classification model having a best classification performance for the minority class during training of the classification models.

11. The classification method of claim 1, wherein the classification models include classification models trained with a same training dataset for different numbers of times.

12. A processor implemented method, comprising:
generating a prediction consistency value that indicates a consistency of prediction of an object in an input image with respect to class prediction values for the object in an input image from classification models to which the input image is input;
identifying a class type corresponding to the object based on the prediction consistency value; and identifying a class of the object using a class prediction model corresponding to the identified class type.

13. The classification method of claim 12, further comprising:

in response to a determination that the class type of the object corresponds to a first class type, identifying the class of the object based on a class prediction value output for the object from a first class prediction model; and in response to a determination that the class type of the object corresponds to a second class type different from the first class type, identifying the class of the object based on a class prediction value output for the object from a second class prediction model different from the first class prediction model.

14. The classification method of claim 12, wherein the generating of the prediction consistency value comprises:

determining a mode class prediction value with a highest frequency among the class prediction values generated from the classification models; and generating the prediction consistency value based on a matching frequency between the class prediction values and the mode class prediction value.

15. The classification method of claim 12, further comprising:

in response to a determination that the prediction consistency value is greater than a threshold value, determining the class type corresponding to the object to be a majority class; and in response to a determination that the prediction consistency value is not greater than the threshold value, determining the class type corresponding to the object to be a minority class.

16. A computing device, comprising:

one or more processors configured to execute instructions; and a memory storing instructions, wherein execution of the instructions by the one or more processors configure the one or more processors to:

generate a prediction consistency value that indicates a consistency of prediction of an object in an input image with respect to class prediction values for the object in an input image from classification models to which the input image is input; and identify a class of the object, including:

in response to a class type being determined, based on the prediction consistency value, of the object being determined to correspond to a majority class, identify a class of the object based on a corresponding class prediction value output for the object from a majority class prediction model; and in response to the class type of the object being determined to correspond to a minority class, identify the class of the object based on another corresponding class prediction value output for the object from a minority class prediction model.

17. The computing device of claim 16, wherein the one or more processors are further configured to:

determine a mode class prediction value with a highest frequency among the class prediction values generated by the classification models; and generate the prediction consistency value based on a matching frequency between the class prediction values and the mode class prediction value.

18. The computing device of claim 16, wherein the one or more processors are further configured to:

in response to a determination that the prediction consistency value is greater than a threshold value, identify the class type corresponding to the object to be the majority class; and in response to a determination that the prediction consistency value is not greater than the threshold value, identify the class type corresponding to the object to be the minority class.

19. The computing device of claim 16, wherein the one or more processors are further configured to:

in response to a determination that the object corresponds to the majority class, identify the class of the object using an ensemble model of the classification models as the majority class prediction model.

20. The computing device of claim 16, wherein the one or more processors are further configured to:

in response to a determination that the object corresponds to the minority class, identify the class of the object using a target classification model selected from among the classification models as the minority class prediction model.

* * * * *